(12) United States Patent
Colquhoun

(10) Patent No.: US 8,651,193 B2
(45) Date of Patent: Feb. 18, 2014

(54) HORSE SHOE SHIELDING DEVICE

(76) Inventor: Muriel Frances Colquhoun, Langbank (GB)

( * ) Notice: Subject to any disclaimer, the term of this patent is extended or adjusted under 35 U.S.C. 154(b) by 484 days.

(21) Appl. No.: 12/717,263

(22) Filed: Mar. 4, 2010

(65) Prior Publication Data
US 2010/0230117 A1 Sep. 16, 2010

(30) Foreign Application Priority Data

Mar. 12, 2009 (GB) .................................. 0904244.1
Jun. 3, 2009 (GB) .................................. 0909565.4

(51) Int. Cl.
*A01L 7/00* (2006.01)
(52) U.S. Cl.
USPC .................................. 168/1; 168/4
(58) Field of Classification Search
USPC .......................... 168/1, 4, 18; 54/82
See application file for complete search history.

(56) References Cited

U.S. PATENT DOCUMENTS

| 752,090 | A | * | 2/1904 | Miller | 168/18 |
|---|---|---|---|---|---|
| 1,101,689 | A | * | 6/1914 | Fuchs | 168/1 |
| 1,152,988 | A | * | 9/1915 | Strob | 168/3 |
| 1,386,613 | A | * | 8/1921 | Frey | 168/18 |
| 1,496,511 | A | * | 6/1924 | Allman | 168/22 |
| 3,486,561 | A | * | 12/1969 | Kulak | 168/4 |
| 4,116,278 | A | * | 9/1978 | Spencer | 168/4 |
| 4,185,695 | A | * | 1/1980 | Hancock | 168/18 |
| 5,588,288 | A | * | 12/1996 | Origgi et al. | 54/82 |
| 5,983,611 | A | * | 11/1999 | Smahl et al. | 54/82 |
| 7,207,163 | B2 | * | 4/2007 | Maestrini | 54/82 |
| 7,302,788 | B1 | * | 12/2007 | Chang | 54/82 |
| 2007/0113524 | A1 | * | 5/2007 | Lander | 54/82 |
| 2008/0264005 | A1 | * | 10/2008 | Ford | 54/82 |

FOREIGN PATENT DOCUMENTS

WO    WO 2006001764 A1 *  1/2006  ............... A01L 3/00

* cited by examiner

*Primary Examiner* — Rob Swiatek
*Assistant Examiner* — Kathleen Alker
(74) *Attorney, Agent, or Firm* — Dickinson Wright PLLC

(57) ABSTRACT

A horse shoe shielding device comprising: a shielding member comprising a concave portion adapted to receive the heel of a horse shoe when worn on a horse such that the heel of the horse shoe is covered by the shielding member; and attachment means adapted to allow attachment of the shielding member to the horse shoe, wherein at least a portion of the shielding member extends rearwards from the attachment means and then upwards to shield the heel of the horse shoe, and wherein the horse shoe shielding device is adapted to cover only a portion of the hoof of the horse.

20 Claims, 2 Drawing Sheets

HORSE SHOE SHIELDING DEVICE

CROSS REFERENCE TO RELATED APPLICATIONS

This application is related to, and claims the benefit of priority from, Great Britain Patent Application Serial Number 0909565.4, filed Jun. 3, 2009, and Great Britain Patent Application Serial Number 0904244.1, filed Mar. 12, 2009, the disclosures of which is incorporated herein by reference in their entireties.

The present invention relates to devices for protecting horse shoes when worn by horses. In particular, but not exclusively, the invention relates to devices adapted to prevent a horse shoe from being removed from the hoof of a horse.

It is known for horses to stand on the heels of its front shoes and/or its hind shoes and thereby ripping or tearing the shoes off the associated hoof. This is a very common occurrence, which is costly and time consuming to remedy. Also, horses can overextend their legs during running which can cause a hind leg to impact a front leg (known as over reaching). This can also lead to the removal of a shoe.

Furthermore, wire or sharp objects or roots and the like can become jammed between the heels of the horse shoe and the underneath of the horse's hooves, and this can lead to the horse shoe being levered off.

A horse may also require remedial shoes such as heart bars. These are very easily pulled off and can restrict the horse to box confinement only.

A set of horse shoes can cost between £75 and £105 per set and these require renewing every 5 or 6 weeks. The cost to the owner of the horse for a blacksmith to come and replace a lost shoe is around £40 and can only be done at a time to suit the blacksmith, or else the horse must be transported to the Smithy. In addition, the loss of a horse shoe can mean the inability of a competition sport horse or race horse to compete or continue its strict exercise and training regime.

It is known to provide over reach boots to protect a horse when one leg impacts another. These are bell shaped boots which pull on or are fastened with a Velcro or rubber strap. It is known that these boots commonly rip through when a horse steps on them. They also frequently turn inside out particularly in heavy or muddy ground so that, instead of covering the heels, they flip up to face upwards and cover the pastern. Over reach boots can prevent bruising on the bulb of the horse's heels. However there is no protection against the loss of shoes by means of a horse treading on its own horse shoe heels.

Elevated heels can alleviate tension and help relax a horse's tendons. Relaxing the flexor tendon reduces pull on the coffin bone. A device which elevates the heels will have the effect of easing the tension on the tendons.

According to a first aspect of the present invention there is provided a horse shoe shielding device comprising:
  a shielding member comprising a concave portion adapted to receive the heel of a horse shoe when worn on a horse such that the heel of the horse shoe is covered by the shielding member; and
  attachment means adapted to allow attachment of the shielding member to the horse shoe,
  wherein at least a portion of the shielding member extends rearwards from the attachment means and then upwards to shield the heel of the horse shoe,
  and wherein the horse shoe shielding device is adapted to cover only a portion of the hoof of the horse.

The attachment means may comprise one or more fasteners, such as a stud or bolt, which is extendable through a corresponding aperture provided at the shielding member to fasten to the existing aperture of the horse shoe.

The fastener may be adapted to provide the required length and head geometry. Alternatively or in addition, the attachment means may comprise a clip or clamp member or an adhesive or the like for fastening the shielding member to the horse shoe.

The horse shoe shielding device may include a reinforcing plate provided at or near the attachment means. The reinforcing plate may include an aperture for receiving the or each fastener.

The horse shoe shielding device may be adapted to cause elevation of the hoof of the horse when worn. The horse shoe shielding device may have a sufficient thickness to cause elevation. Alternatively or in addition, a portion the attachment means may cause elevation of the hoof. Alternatively or in addition, the horse shoe shielding device may include one or more rear supports for elevating the hoof.

The shielding member may be formed from a resilient material such as strengthened rubber. At least a portion of the shielding member may be cushioned to absorb impact forces.

The attachment means may include a strap for wrapping around the front hoof portion. The strap may be fastened using Velcro.

According to a second aspect of the present invention there is provided a method of protecting a horse shoe when worn by a horse, the method comprising:
  providing a shielding member having a concave portion;
  inserting the heel of the horse shoe within the concave portion such that the heel of the horse shoe is covered by the shielding member; and
  attaching the shielding member to the horse shoe such that at least a portion of the shielding member extends rearwards from the attachment means and then upwards to shield the heel of the horse shoe; and
  covering only a portion of the hoof of the horse with the shielding member.

The method may include attaching the shielding member to an existing aperture of the horse shoe. The method may include inserting one or more fasteners, through a corresponding aperture provided at the shielding member to fasten to the existing aperture of the horse shoe.

Alternatively, in the case where the shielding member does not include an existing aperture, the method may include forming at least one impression in the shielding member at a location corresponding to the existing aperture of the horse shoe and then forming an aperture at the or each impression.

The method may include reinforcing the shielding member at or near the attachment means.

The method may include causing elevation of the hoof of the horse using the horse shoe shielding device.

The method may include providing a strap for wrapping around the front hoof portion.

An embodiment of the present invention will now be described, by way of example only, with reference to the accompanying drawings in which.

Figure 1:
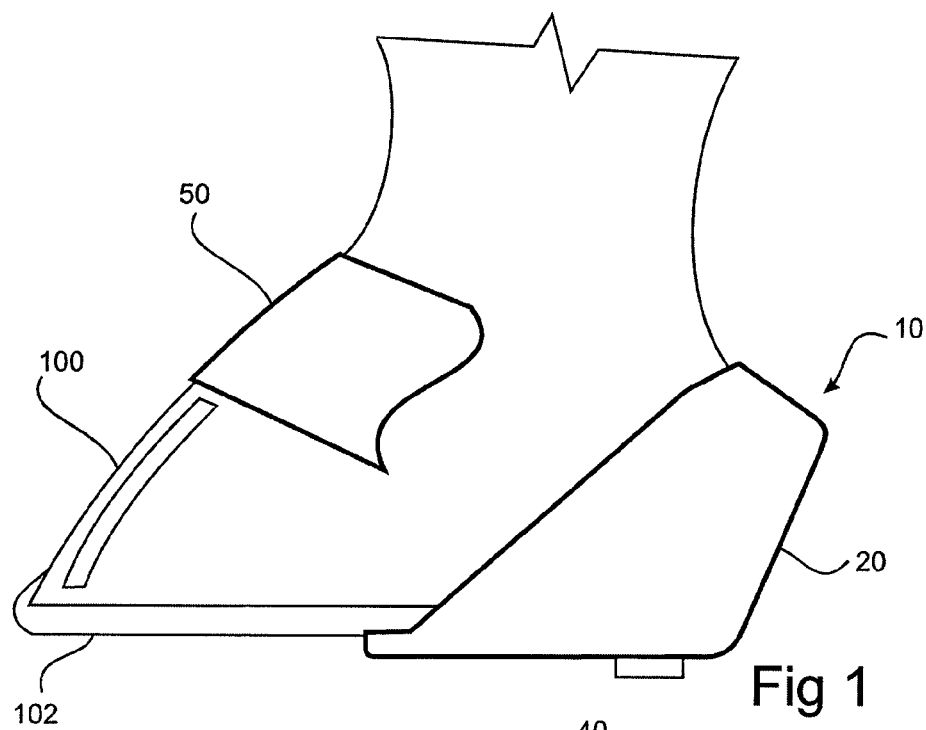
FIG. 1 is a side view of the horse shoe shielding device fitted to the hoof of a horse.
Figure 2:
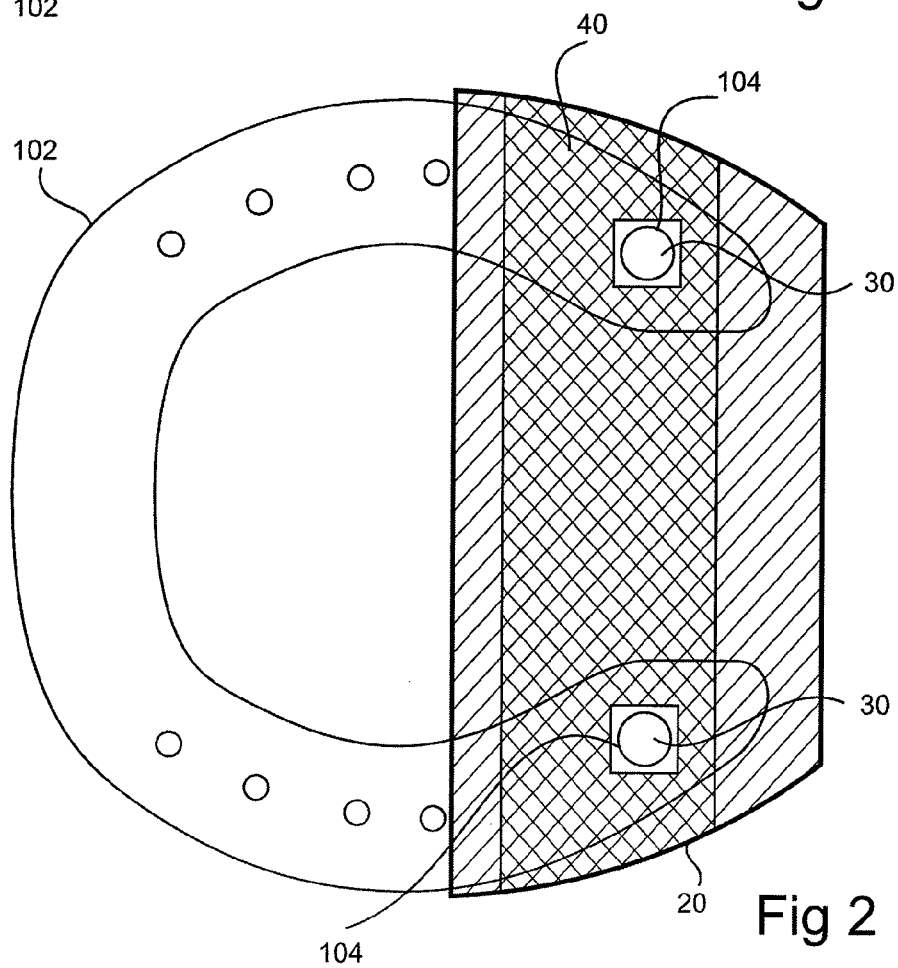
FIG. 2 is an underside view of the device of FIG. 1 fitted to the hoof.
Figure 3:
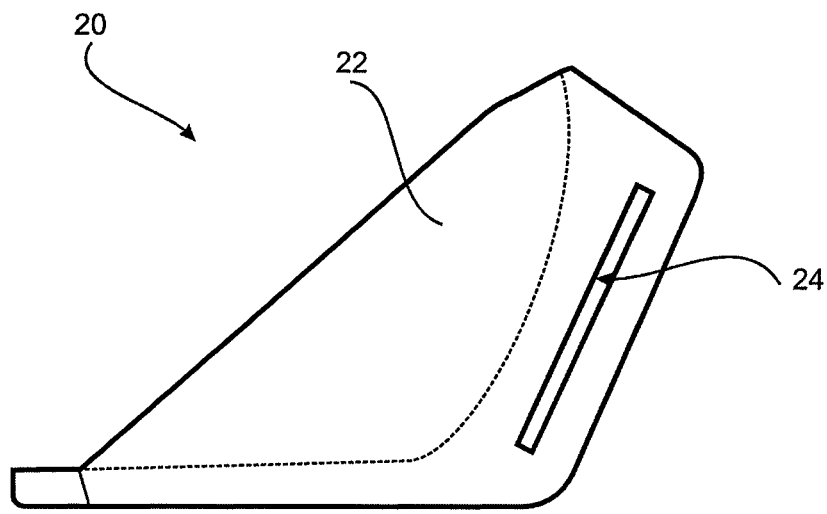
FIG. 3 is a side view of the shielding member of the device of FIG. 1.
Figure 4:
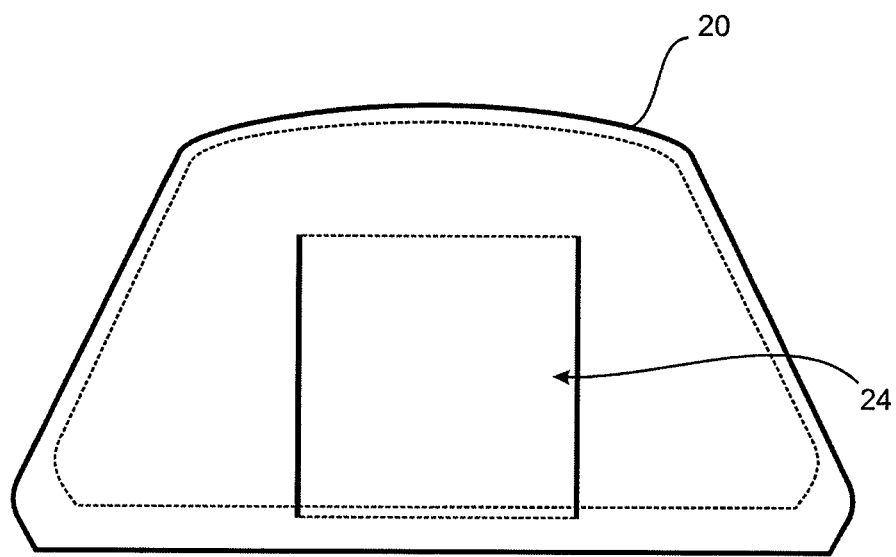
FIG. 4 is a rear view of the shielding member of FIG. 3.

FIGS. 1 and 2 shows a horse shoe shielding device 10 which comprises a shielding member 20 having a concave portion 22 (best seen in FIG. 3) generally corresponding to the heel of the hoof 100 of a horse. The heel of the horse shoe is therefore shielded and covered by the shielding member 20. The hooves of horses vary in size and shape, but the shielding member 20 is formed from a resilient but tough material, such as strengthened rubber, that can adapt to the individual hoof 100 and its horse shoe.

The shielding member 20 is attached to the horse shoe 102. Horse shoes are supplied with two existing apertures 104, and bolts 30 are provided which fasten to these apertures 104. This provides a far more secure connection than conventional horse boots which quickly slip or become detached. The bolt can be a bespoke bolt or a standard bolt which has been adapted to provide the required length and head geometry.

The existing apertures 104 of horse shoes can quickly become clogged with mud and stones and the thread of the apertures 104 can be damaged. A plug, such as formed from a polymer like polyurethane, can be provided to fit into the apertures 104 when the horse shoe shielding device 10 is not being used to protect the threads.

Interposing the shielding member 20 and the horse shoe 102 is a reinforcing plate 40 formed from steel. The reinforcing plate 40 includes two apertures for receiving the bolts 30.

For additional attachment, a strap 50 can be provided for wrapping around the front hoof portion. The strap can be fastened using Velcro. The shielding member 20 includes a strap slot 24 and the strap 50 is fed through this slot 24.

For fitting the horse shoe shielding device 10, the hoof 100 is first inserted within the concave portion 22 of the shielding member 20. The shielding member 20 can include existing apertures for attaching the shielding member 20 to the horse shoe 102. The apertures can be provided as slots to accommodate variations in the shape and size of the hoof 100. The bolts 30 can then be fastened to secure the horse shoe shielding device 10 to the horse shoe 102.

Alternatively, the shielding member 20 can be provided without existing apertures. With the shielding member 20 in the correct place, a tool can be used to form an impression or marking or pilot hole in the shielding member at locations corresponding to the existing apertures of the horse shoe. Although covered, these locations can be 'felt' since the shielding member 20 will not be flat against the horse shoe 102 at the existing holes. Apertures in the shielding member 20 can then be formed, using a stamp or hole cutter or the like, at the locations.

The horse shoe shielding device 10 can be adapted to cover any amount of the hoof of the horse, as long as the heels of the horse shoe 102 are covered. However, extending the shielding member 20 upwards and forwards provides additional advantages. The frog of the hoof can be protected from stones and the upwards extension protects the hoof from impact by another hoof.

The horse shoe shielding device 10 can also be adapted to cause elevation of the hoof 100 of the horse when worn. The shielding member 20 along with the thickness of the bolt heads can cause elevation. This elevation helps restore and maintain a correct hoof pastern axis and reduce tension on the tendons and ligaments in the distal (lower) part of the limb. Together with the cushioning effect of the shield, these properties help reduce concussion and compression of the heel, thereby preserving good hoof conformation and balance and protecting against heel pain and associated lameness.

Although possibly covering the back quarter of the horse shoe 102 and the hoof 100, the device 10 still allows freedom of air flow to avoid infection and fungal problems. The device is relatively lightweight and easily attachable to the horse shoe 102.

Whilst specific embodiments of the present invention have been described above, it will be appreciated that departures from the described embodiments may still fall within the scope of the present invention.

The invention claimed is:

1. A horseshoe shielding device for shielding a heel of a horseshoe subsequent to the horseshoe being fixed to the underside of a horse's hoof, the horseshoe having a ground-contacting sole and being of the type that is comprised of a heel, a toe and branches extending from the toe, and said branches, when the horseshoe is fixed to the underside of the horse's hoof, extend along quarter areas of the horse's hoof and terminate at or proximate the heel of the hoof, the shielding device comprising:

a shielding member having a bottom and at least one sidewall extending upwardly from the bottom, the bottom and at least one sidewall defining a concave portion configured to partially receive therein the horseshoe fixed to the horse's hoof, wherein the concave portion is shaped so that when attached to the horse's hoof the shielding member covers the entire heel of the horseshoe, only a portion of each branch of the horseshoe extending along the quarter areas of the horse's hoof, and only a portion of the sidewall of the horse's hoof proximate the quarter areas of the horse's hoof; and at least one fastener extending through the bottom of the shielding member, the at least one fastener adapted to fasten the shielding member directly to the horseshoe.

2. The horseshoe shielding device as claimed in claim 1, wherein the at least one fastener is adapted to fasten the shielding member to an existing aperture of the horseshoe.

3. The horseshoe shielding device as claimed in claim 2, wherein the at least one fastener is extendable through a corresponding aperture of the shielding member to fasten to the existing aperture of the horseshoe.

4. The horseshoe shielding device as claimed in claim 3, including a reinforcing plate provided at or near the at least one fastener.

5. The horseshoe shielding device as claimed in claim 4, wherein the reinforcing plate includes an aperture for receiving the at least one fastener.

6. The horseshoe shielding device as claimed in claim 1, wherein the shielding member is adapted to cause elevation of the hoof of the horse when fastened to the horseshoe.

7. The horseshoe shielding device as claimed in claim 1, wherein the shielding member is formed from a resilient material.

8. The horseshoe shielding device as claimed in claim 7, wherein at least a portion of the shielding member is cushioned to absorb impact forces.

9. The horseshoe shielding device as claimed in claim 1, further comprising a strap for wrapping around a front hoof portion, wherein the strap extends from the portion of the shielding member adapted to cover at least a portion of the sidewall of the hoof proximate the quarter areas of the horse's hoof.

10. A method of protecting a horseshoe subsequent to the horseshoe being fixed to the underside of a horse's hoof, the horseshoe having a ground-contacting sole and being of the type that is comprised of a heel, a toe and branches extending from the toe, and said branches, when the horseshoe is fixed to the underside of the horse's hoof, extend along quarter areas of the horse's hoof and terminate at or proximate the heel of the hoof, the method comprising:

providing a shielding member having a bottom and at least one sidewall extending upwardly from the bottom, the bottom and at least one sidewall defining a concave portion configured to receive therein the entire heel of the horseshoe and only a portion of each branch of the horseshoe extending along the quarter areas of the horse's hoof, and to cover only a portion of the sidewall of the horse's hoof proximate the quarter areas of the horse's hoof;

inserting a heel of the horseshoe within the concave portion such that the shielding member covers the entire heel of the horseshoe and only the portion of each branch of the horseshoe extending along the quarter areas of the horse's hoof and such that the at least one sidewall covers only a portion of the sidewall of the horse's hoof proximate the quarter areas of the horse's hoof; and fastening the shielding member directly to the horseshoe with at least one fastener extending through the bottom of the shielding member.

11. The method as claimed in claim 10, including locating the shielding member relative to an existing aperture of the horseshoe.

12. The method as claimed in claim 11, including inserting the at least one fastener through a corresponding aperture of the shielding member to fasten to the existing aperture of the horseshoe.

13. The method as claimed in claim 11, including forming at least one impression in the shielding member at a location corresponding to the existing aperture of the horseshoe and then forming an aperture at the at least one impression.

14. The method as claimed in claim 10, including reinforcing the shielding member at the location of the at least one fastener.

15. The method as claimed in claim 10, including causing elevation of the hoof of the horse using the shielding member.

16. The method as claimed in claim 10, further including providing a strap for wrapping around the front hoof portion, wherein the strap extends from the portion of the shielding member extending upwards to cover at least a portion of the sidewall of the hoof proximate the quarter areas of the horse's hoof.

17. The method as claimed in claim 10, wherein the shielding member is adapted so that, in the step of fastening the shielding member to the horseshoe, at least portions of the horseshoe sole proximate the heel of the horse's hoof and extending along the quarter areas of the horse's hoof are captured between the shielding member and the hoof of the horse.

18. The horseshoe shielding device as claimed in claim 1, wherein the shielding member is adapted so that, when fastened to a horseshoe when fixed to a horse's hoof, at least portions of the horseshoe sole proximate the heel and extending along the quarter areas of the horse's hoof are captured between the shielding member and the hoof of the horse.

19. A method of partially covering a horseshoe when the horseshoe is fixed to the hoof of a horse, the horseshoe having a heel and a ground-contacting sole, the method comprising the steps of:

providing a shielding member having a bottom and at least one sidewall extending upwardly from the bottom, the bottom and at least one sidewall defining a concave portion configured to partially receive therein the horseshoe, wherein the concave portion is shaped such that the shielding member covers only part of the horse's hoof and only in the heel and quarter areas of the horse's hoof;

placing the shielding member over the horseshoe that is already fixed to the horse's hoof, so that the entire heel of the horseshoe is received within the concave portion of the shielding member; and attaching the shielding member directly to the horseshoe so that only portions of the horseshoe sole proximate the heel and extending along the quarter areas of the horse's hoof are captured between the shielding member and the hoof of the horse.

20. The method of claim 19, wherein the horseshoe is of the type that comprises a toe and branches which, when the horseshoe is fixed to the hoof, extend along the quarter areas of the horse's hoof and terminate at or proximate the heel of the horse's hoof, and wherein, when the shielding member is placed over the horseshoe on the horse's hoof, the shielding member covers the entire heel of the horseshoe, a portion of each branch of the horseshoe extending along the quarter areas of the horse's hoof, and at least a sidewall of the horse's hoof proximate the heel of the horse's hoof.

* * * * *